US012725821B2

(12) United States Patent
Lee

(10) Patent No.: US 12,725,821 B2
(45) Date of Patent: Sep. 1, 2026

(54) METHOD FOR PREPARING HIGHLY-DISPERSIBLE RADICAL SCAVENGER METAL OXIDE-IONOMER NANOCOMPOSITE BY USING SELF-ASSEMBLY PROCESS AND FUEL CELL COMPRISING NANOCOMPOSITE PREPARED THEREBY

(71) Applicant: DANKOOK UNIVERSITY CHEONAN CAMPUS INDUSTRY ACADEMIC COOPERATION FOUNDATION, Cheonan-si (KR)

(72) Inventor: Chang Hyun Lee, Seongnam-si (KR)

(73) Assignee: DANKOOK UNIVERSITY CHEONAN CAMPUS INDUSTRY ACADEMIC COOPERATION FOUNDATION, Cheonan-si (KR)

( * ) Notice: Subject to any disclaimer, the term of this patent is extended or adjusted under 35 U.S.C. 154(b) by 666 days.

(21) Appl. No.: 18/036,937

(22) PCT Filed: Aug. 17, 2021

(86) PCT No.: PCT/KR2021/010884
§ 371 (c)(1),
(2) Date: May 15, 2023

(87) PCT Pub. No.: WO2022/102917
PCT Pub. Date: May 19, 2022

(65) Prior Publication Data

US 2023/0307679 A1 Sep. 28, 2023

(30) Foreign Application Priority Data

Nov. 16, 2020 (KR) ........................ 10-2020-0152776

(51) Int. Cl.
*H01M 8/1039* (2016.01)
*C08F 214/26* (2006.01)
(Continued)

(52) U.S. Cl.
CPC ....... *H01M 8/1039* (2013.01); *C08F 214/262* (2013.01); *C08K 3/22* (2013.01);
(Continued)

(58) Field of Classification Search
CPC ............. H01M 8/1039; H01M 4/8668; H01M 8/1004; C08F 214/262; C08K 3/22;
(Continued)

(56) References Cited

U.S. PATENT DOCUMENTS

2018/0198117 A1* 7/2018 Tiquet .................... C09D 11/04

FOREIGN PATENT DOCUMENTS

KR 10-2010-0003780 A 1/2010
KR 10-1764068 B1 8/2017
KR 10-2018-0078061 A 7/2018

OTHER PUBLICATIONS

Huijie, Zhang et al. Synthesis of Nafion/CeO2 hybrid for chemically durable proton exchange membrane of fuel cell. Journal of Membrane Science. Jul. 23, 2012, vols. 421-422, pp. 201-210.

(Continued)

*Primary Examiner* — James M Erwin
(74) *Attorney, Agent, or Firm* — Morgan, Lewis & Bockius LLP

(57) ABSTRACT

The present invention relates to: a method for preparing a nanocomposite of an ionomer and a metal oxide acting as a radical scavenger; and a fuel cell comprising a nanocomposite prepared thereby and, more specifically, to: a method for preparing a highly-dispersible radical scavenger metal oxide-ionomer nanocomposite which can be redispersed to the size of nanoparticles in an aqueous alcohol solution or an (Continued)

ionomer solution; and a membrane electrode assembly and fuel cell comprising a nanocomposite prepared thereby.

9 Claims, 7 Drawing Sheets

(51) Int. Cl.

| | |
|---|---|
| ***C08K 3/22*** | (2006.01) |
| ***H01M 4/86*** | (2006.01) |
| ***H01M 8/1004*** | (2016.01) |
| *H01M 8/10* | (2016.01) |

(52) U.S. Cl.

CPC ....... *H01M 4/8668* (2013.01); *H01M 8/1004* (2013.01); *C08K 2003/2213* (2013.01); *C08K 2003/2227* (2013.01); *C08K 2201/00* (2013.01); *C08K 2201/011* (2013.01); *H01M 2008/1095* (2013.01); *H01M 2300/0082* (2013.01)

(58) Field of Classification Search

CPC .... C08K 2003/2213; C08K 2003/2227; C08K 2201/00; C08K 2201/011

USPC ........................................................ 429/483

See application file for complete search history.

(56) References Cited

OTHER PUBLICATIONS

Velayutham, Parthiban et al. A Nafion-Ceria Composite Membrane Electrolyte for Reduced Methanol Crossover in Direct Methanol Fuel Cells. Energies. Feb. 21, 2017, vol. 10, Issue 2, p. 25 9(1-13).

International Search Report and Written Opinion issued in corresponding International Patent Application No. PCT/KR2021/010884, dated Nov. 30, 2021.

* cited by examiner

【FIG. 1】
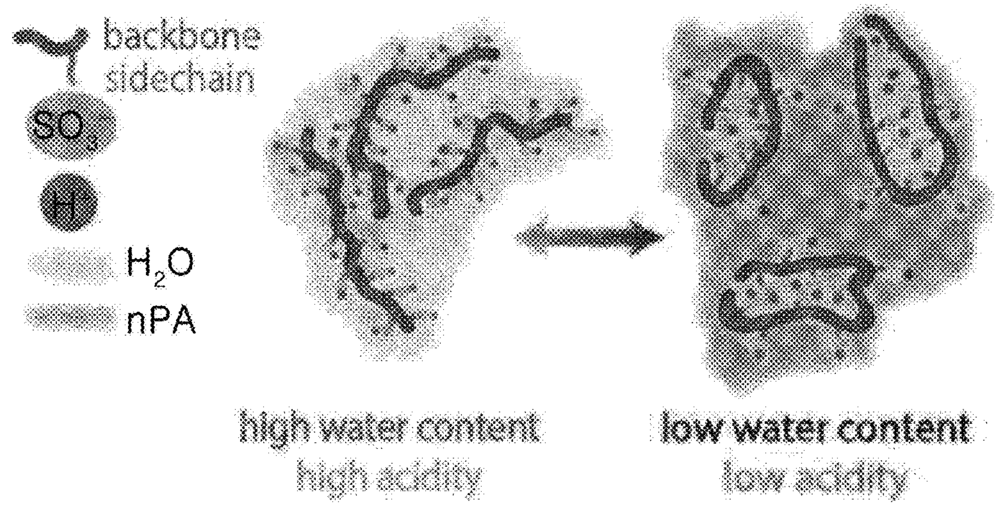
【FIG. 2】
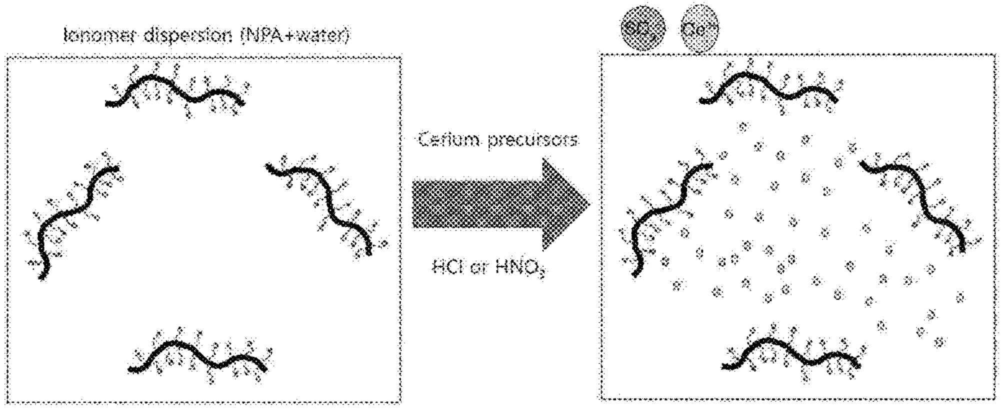

【FIG. 3】
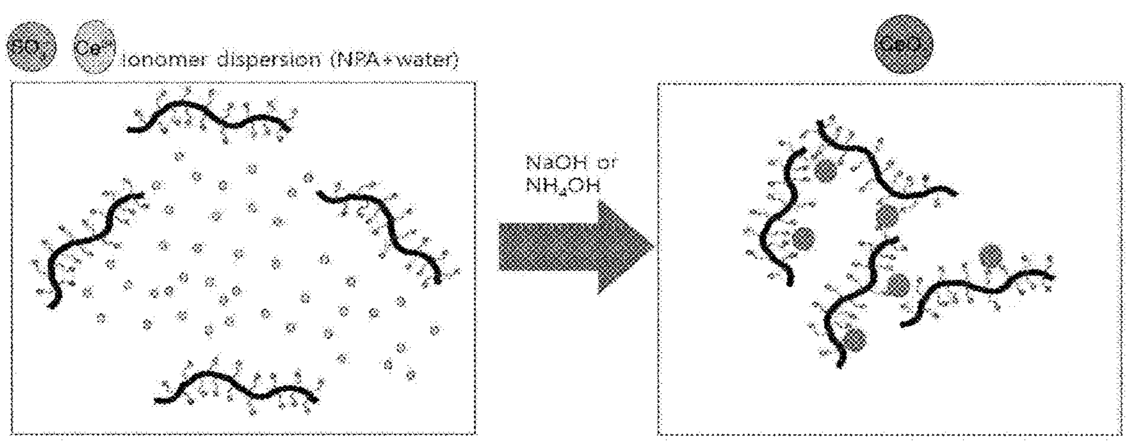
【FIG. 4】
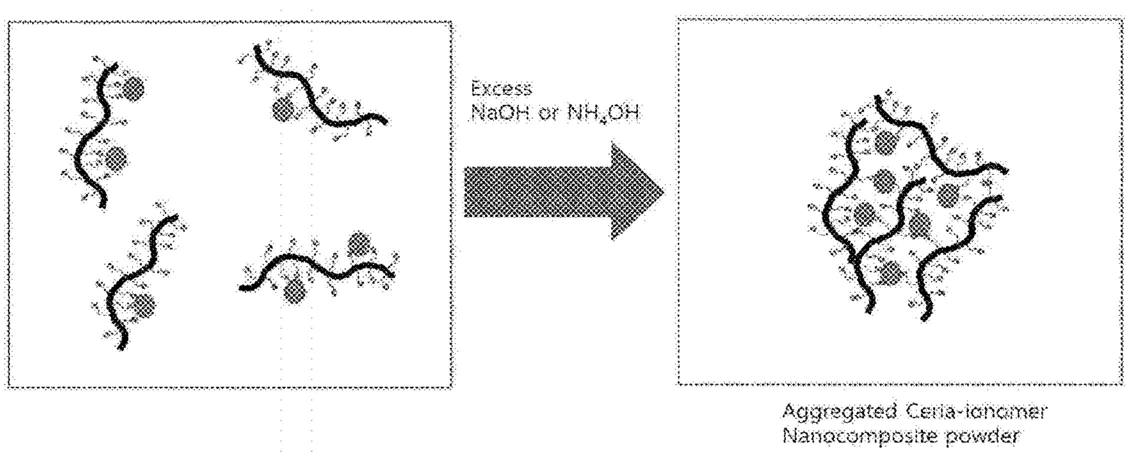

【FIG. 5】
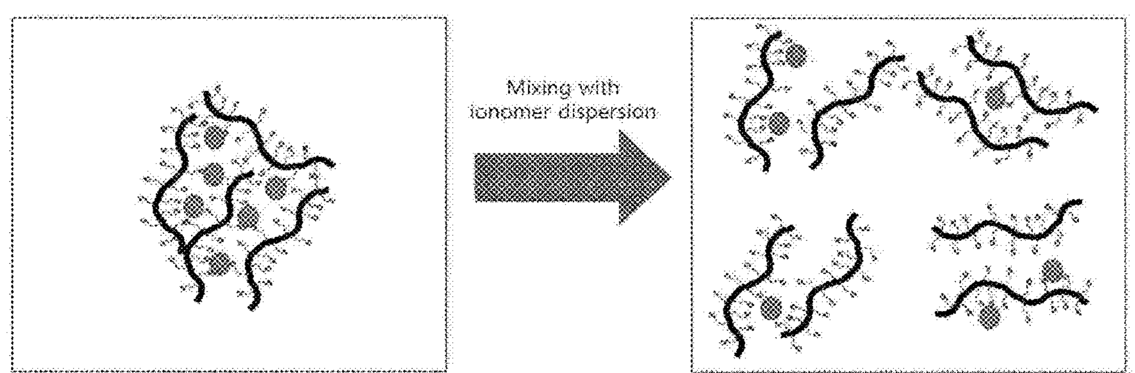
【FIG. 6】
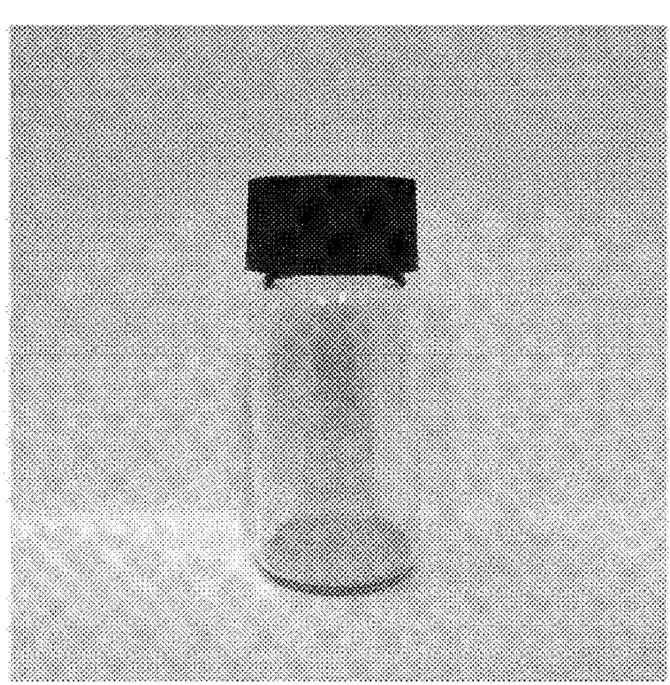

【FIG. 7】
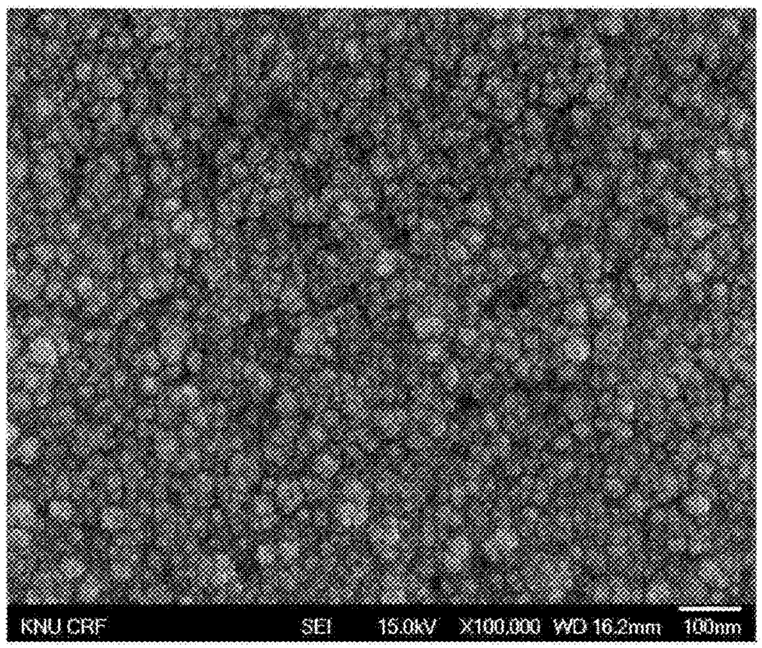
【FIG. 8】
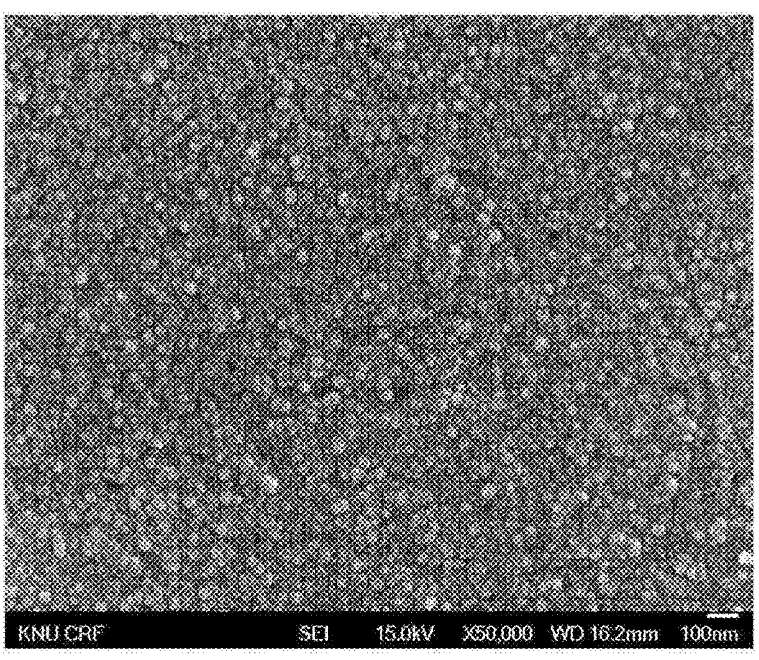

【FIG. 9】
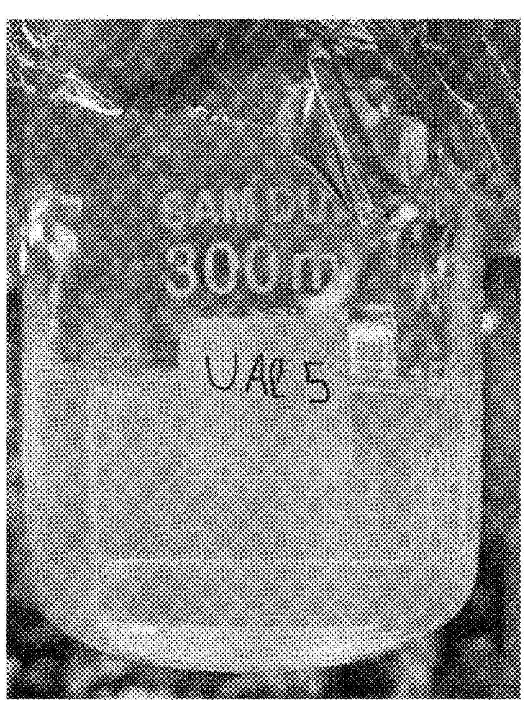
【FIG. 10】
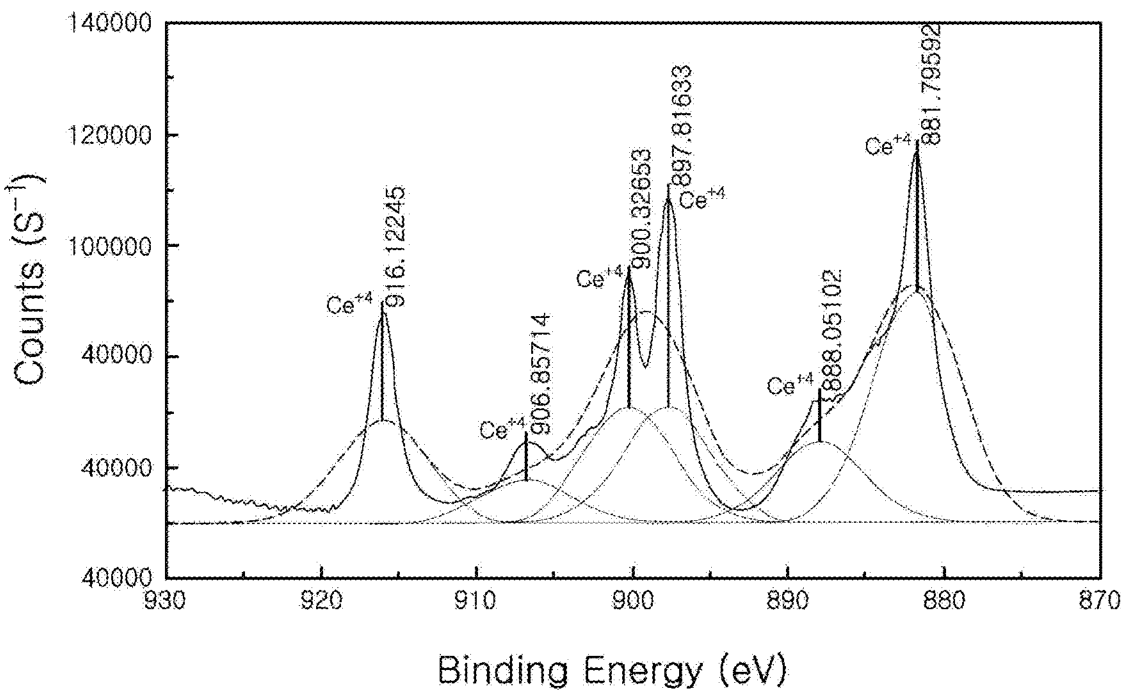

【FIG. 11】
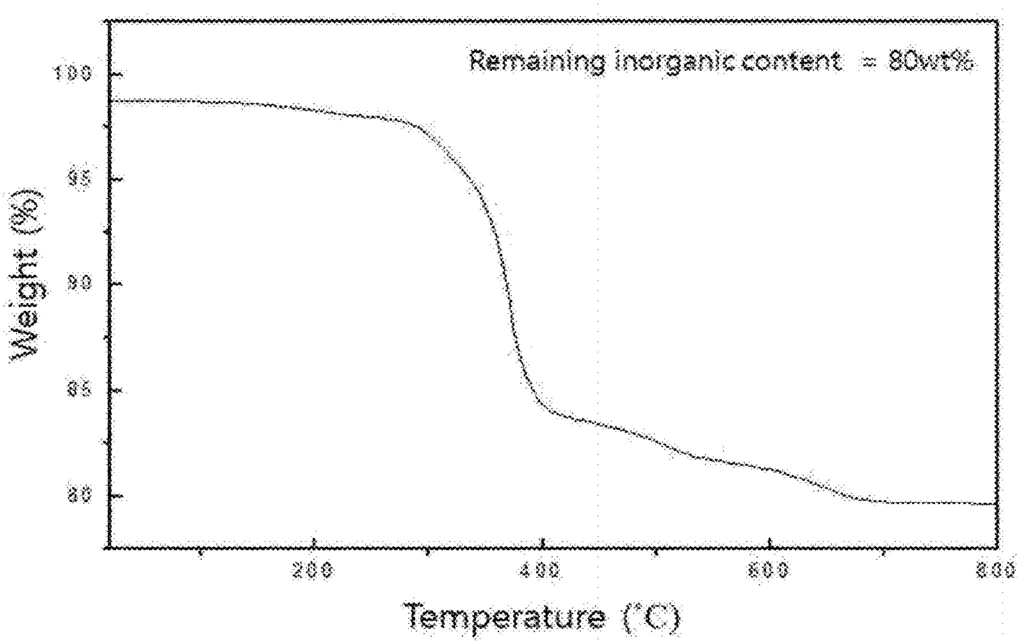
【FIG. 12】
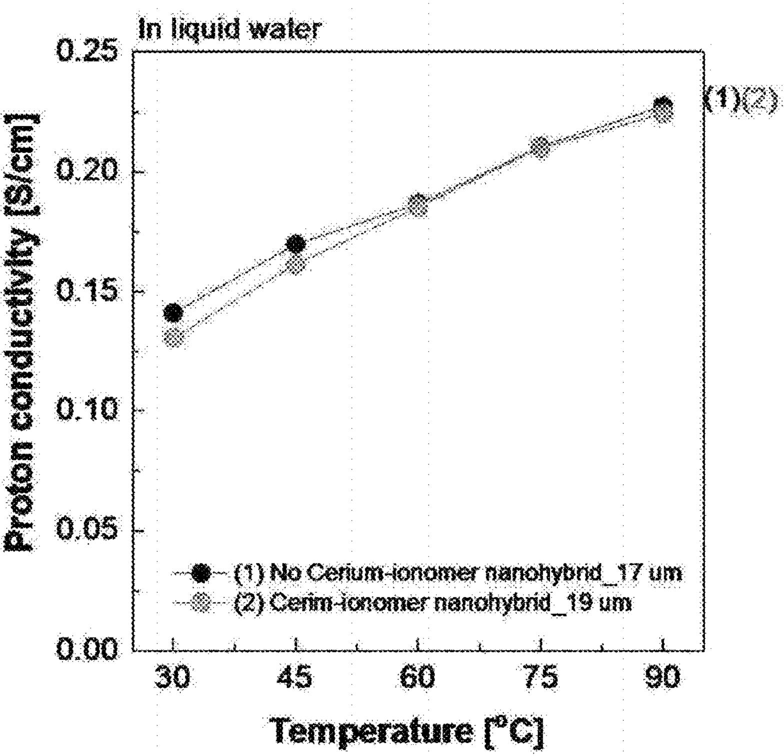

【FIG. 13】
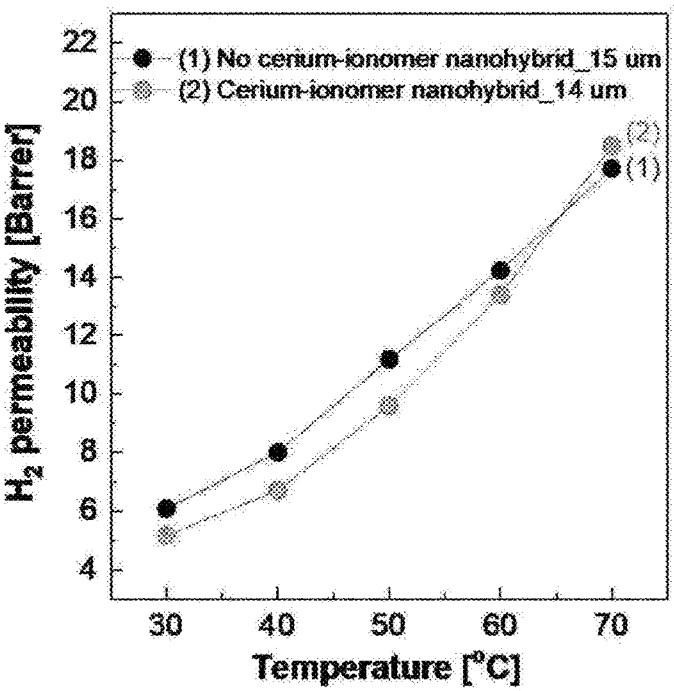
【FIG. 14】
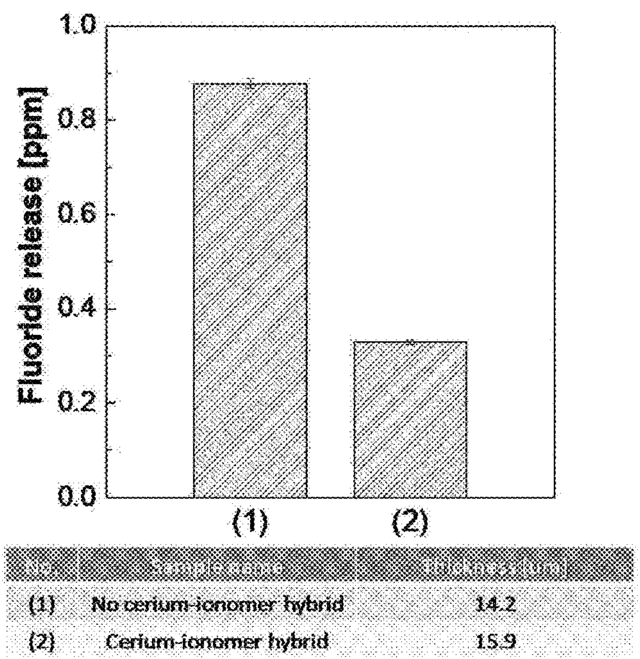
| [illegible] | [illegible] | [illegible] |
|---|---|---|
| (1) | No cerium-ionomer hybrid | 14.2 |
| (2) | Cerium-ionomer hybrid | 15.9 |

METHOD FOR PREPARING HIGHLY-DISPERSIBLE RADICAL SCAVENGER METAL OXIDE-IONOMER NANOCOMPOSITE BY USING SELF-ASSEMBLY PROCESS AND FUEL CELL COMPRISING NANOCOMPOSITE PREPARED THEREBY

TECHNICAL FIELD

The present invention relates to a method for preparing a metal oxide-ionomer nanocomposite acting as a radical scavenger and a fuel cell including the nanocomposite prepared thereby, and more specifically, to a method for preparing highly-dispersible radical scavenger metal oxide-ionomer nanocomposite that can be redispersed in an aqueous alcohol solution or an ionomer solution in a nanoparticle size, and a membrane electrode assembly and fuel cell including the nanocomposite prepared thereby.

BACKGROUND ART

Metal oxide nanoparticles known to be very effective in improving the oxidation stability and chemical stability of materials by removing various active radicals include cerium oxide nanoparticle, zirconium oxide nanoparticle, manganese oxide nanoparticle, aluminum oxide nanoparticle, vanadium oxide nanoparticle, cerium-zirconium oxide nanoparticle or the like. These metal oxides are prepared by various methods such as a precipitation method, a reverse micellar method, and a hydrothermal method using a wide variety of metal precursors. In order to act as an effective radical scavenger even with a small amount of use along with uniform dispersion in a proton conductive polymer defined as an ionomer, the metal oxides must be prepared in the form of nanoparticles and uniformly nano-dispersed in the ionomer matrix.

However, since the radical scavenger metal oxide nanoparticles produced in most of the processes are obtained in the form of aggregated micron-sized powder through heat treatment to increase crystallinity, there is a problem in that the redispersion of the nanoparticles in an aqueous alcohol solution and an ionomer matrix is impossible and the nanoparticles are very easily aggregated even after forced dispersion.

In order to disperse the radical scavenger metal oxide nanoparticles in a nanoscale size in an aqueous alcohol solution, organic materials such as polymers or surfactants must be present on the surface of the metal oxide nanoparticles. Therefore, in order to prepare radical scavenger metal oxide nanoparticles with high dispersibility, materials such as polyacrylic acid, citric acid, and oleic acid and various types of surfactants are mainly used as dispersants.

However, the case of improving the dispersion characteristics of the radical scavenger metal oxide without using separate additives such as surfactants or dispersants and using the self-assembly process between the ionomer and the radical scavenger metal oxide and applying the radical scavenger metal oxide to the fuel cell manufacturing process has not been reported so far.

DISCLOSURE

Technical Problem

The object to be achieved by the present invention is to prepare a nano-dispersed solution in the form of a kind of nanocomposite in which a radical scavenger metal oxide nanoparticles and an ionomer are combined by adding and dissolving a radical scavenger metal oxide precursor in an ionomer dispersion, and using a self-assembly process between the ionomer and the radical scavenger metal oxide precursor.

In addition, another technical object of the present invention is to provide a method for preparing a highly-dispersible radical scavenger metal oxide-ionomer nanocomposite dispersion capable of being highly dispersed in a nanoparticle size in an aqueous alcohol solution or an ionomer dispersion by separating and drying a radical scavenger metal oxide-ionomer nanocomposite from a dispersion and obtaining a powdered radical scavenger metal oxide-ionomer nanocomposite, and dispersing the powdered radical scavenger metal oxide-ionomer nanocomposite in the ionomer nanodispersion again to prepare a solution, and to utilize the radical scavenger metal oxide-ionomer nanocomposite in a polymer electrolyte fuel cell (PEFC) as an antioxidant.

Technical Solution

In order to achieve the above object, the present invention provides a method for preparing a highly-dispersable radical scavenger metal oxide-ionomer nanocomposite in which a metal oxide nanoparticle and an ionomer are dispersed in a nanocomposite form through a self-assembly process, comprising the steps of a) dissolving a radical scavenger metal oxide precursor in a perfluorinated sulfonic acid ionomer dispersion; and b) adding sodium hydroxide or ammonia aqueous solution to the dispersion to form a radical scavenger metal oxide-ionomer nanoparticle in an in-situ manner. The method may further comprise, after the step b), the step c) separating and drying the radical scavenger metal oxide-ionomer nanocomposite to obtain a powder state of the radical scavenger metal oxide-ionomer nanocomposite.

In addition, the present invention provides a metal oxide-ionomer nanocomposite in which a radical scavenger metal oxide is synthesized in-situ from an ion-type radical scavenger metal oxide precursor in a perfluorinated sulfonic acid ionomer dispersion, and the radical scavenger metal oxide nanoparticle and an ionomer are dispersed in a nanocomposite form through self-assembly process. The nanocomposite may be redispersed in the size of nanoparticle in an aqueous alcohol solution or an ionomer solution.

In addition, the present invention provides a membrane electrode assembly for a fuel cell, which comprises an anode and cathode composed of an electrode layer containing a catalyst and an ionomer and an electrolyte membrane disposed between the anode and the cathode, wherein the highly-dispersible radical scavenger metal oxide-ionomer nanocomposite is included in at least one of the electrode layer and the electrolyte membrane, and a fuel cell comprising the membrane electrode assembly.

Advantageous Effects

According to the present invention, when the radical scavenger metal oxide nanoparticles are synthesized from the radical scavenger metal oxide precursor in the ionomer dispersion, the radical scavenger metal oxide nanoparticles do not aggregate and are evenly dispersed in the ionomer without a separate surfactant or dispersant, and can maintain the dispersed state for a long time.

As illustrated in the SEM image of FIG. 7, as a result of measuring the microstructure of the cerium oxide-ionomer nanocomposite powder, which is one of the radical scavenger metal oxides, it was found that the particles with a size of 5 to 10 nm were evenly dispersed throughout. After adding and dispersing the cerium oxide-ionomer nanocomposite to the solution in which the perfluorinated sulfonic acid ionomer was dispersed, the particle size of the dispersion was measured by laser light scattering, and as a result, it was confirmed that the particle size of the dispersion was in the range of 30 to 40 nm.

The metal oxide-ionomer nanocomposite prepared according to the present invention has excellent dispersibility to the extent that it can be redispersed in an aqueous alcohol solution or ionomer solution in the size of nanoparticles, thereby improving compatibility with the ionomer of an electrode layer or a polymer electrolyte membrane. Therefore, the metal oxide-ionomer nanocomposite can be effectively applied to the fuel cell manufacturing process.

In particular, when applying the technology of synthesizing radical scavenger metal oxide nanoparticles from a radical scavenger metal oxide precursor having high chemical durability and oxidation stability in an ionomer dispersion according to the present invention to an electrolyte membrane for a fuel cell, radical scavenger metal ions, which are convenient for initial introduction, can be in-situ converted into radical scavenger metal oxide nanoparticles. Therefore, advantages of both metal ion type and oxide type of radical scavengers can be used, and ultimately the durability and performance of the fuel cell can be improved.

DESCRIPTION OF DRAWINGS

FIG. 1 is a schematic diagram illustrating the state of perfluorinated sulfonic acid ionomer nanoparticles dispersed in a mixed solvent composed of alcohol and water.

FIG. 2 is a view illustrating a state in which a radical scavenger metal oxide precursor is dissolved in a perfluorinated sulfonic acid ionomer nanodispersion and an ionic bond is formed between a radical scavenger metal cation and a sulfonic acid group of the perfluorinated sulfonic acid ionomer.

FIG. 3 is a view illustrating a dispersion state of radical scavenger metal oxide nanoparticles formed by adding NaOH or NH4OH to a solution in which a radical scavenger metal cation and a sulfonic acid group of a perfluorinated sulfonic acid ionomer are ionically bonded.

FIG. 4 is a view illustrating a process in which precipitates occur by adding an excess of NaOH or $NH_4OH$ to the radical scavenger metal oxide nanodispersion for rapid pH change.

FIG. 5 is a view illustrating a state in which a radical scavenger metal oxide-ionomer nanocomposite powder is redispersed in a solution.

FIG. 6 shows a photograph of a cerium oxide-ionomer nanocomposite powder prepared according to Example 1 of the present invention.

FIGS. 7 and 8 show SEM photographs of cerium oxide-ionomer nanocomposite powder prepared according to Example 1 of the present invention.

FIG. 9 shows a photograph of an aluminum oxide-ionomer nanocomposite dispersion prepared according to Example 2 of the present invention.

FIGS. 10 and 11 show XPS spectra and graphs illustrating the content of cerium oxide($Ce^{4+}$) prepared in the form of tetravalent ion, which is a radical scavenger metal oxide, in the nanocomposite prepared according to Example 1 of the present invention.

FIGS. 12 and 13 show graphs illustrating hydrogen ion conductivity and gas permeability after introducing a cerium oxide-ionomer nanocomposite, which is a radical scavenger metal oxide prepared according to Example 1 of the present invention, into an electrolyte membrane.

FIG. 14 shows a graph illustrating the Fenton test results after introducing the radical scavenger metal oxide cerium oxide-ionomer nanocomposite prepared in Example 1 of the present invention into an electrolyte membrane.

MODE FOR INVENTION

The present invention will be described in more detail through the following examples and drawings.

The present invention relates to a highly-dispersible radical scavenger metal oxide-ionomer nanocomposite that can be redispersed in a nano size in an aqueous alcohol solution and an ionomer solution prepared using a perfluorinated sulfonic acid ionomer instead of a conventional dispersant.

A perfluorinated sulfonic acid ionomer is a material having a sulfonic acid group as a functional group in the main chain of a perfluorinated polymer, and is manufactured in the form of a cation exchange membrane and is widely used as an electrolyte membrane for a fuel cell. The present invention is to prepare radical scavenger metal oxide nanoparticles that can be redispersed in a nano size in an aqueous alcohol solution and an ionomer solution by using the perfluorinated sulfonic acid ionomer as a dispersion medium.

FIG. 1 is a schematic diagram illustrating the state of perfluorinated sulfonic acid ionomer nanoparticles dispersed in a mixed solvent composed of alcohol and water. The perfluorinated sulfonic acid ionomer is dispersed in the form of particles in a mixed solvent of normal propyl alcohol, which is an example of an aqueous alcohol solution, and water.

After adding a radical scavenger metal oxide precursor to a solution in which a perfluorinated sulfonic acid ionomer is dispersed in the form of nanoparticles in a mixed solvent of normal propyl alcohol and water, when a certain amount of hydrochloric acid or nitric acid is added, the radical scavenger metal oxide precursor is dissolved and then exists in a form of radical scavenger metal cation. This radical scavenger metal cation exists in the ionomer dispersion in the form of ionic bond with the sulfonic acid group of the perfluorinated sulfonic acid ionomer (FIG. 2).

When a certain amount of sodium hydroxide or ammonia solution is added to a solution in which the radical scavenger metal cation and the perfluorinated sulfonic acid ionomer exist in an ionic bond, the radical scavenger metal cation undergoes a hydrolysis-condensation reaction to form a radical scavenger metal oxide, that is, converting into a metal oxide nanoparticle such as a cerium oxide nanoparticle, a zirconium oxide nanoparticle, a manganese oxide nanoparticle, and an aluminum oxide nanoparticle. The produced metal oxide nanoparticles do not aggregate with each other due to the electrostatic attraction with the sulfonic acid group of the perfluorinated sulfonic acid ionomer, and can exist in the form of nanoparticles. (FIG. 3)

When an excessive amount of sodium hydroxide or ammonia solution is added to the nanodispersion, which forms a stable dispersed phase due to the electrostatic attraction between the sulfonic acid groups of the perfluorinated sulfonic acid ionomer and the metal oxide nanoparticles, the pH of the solution is rapidly changed and the dispersion stability of perfluorinated sulfonic acid ionomer and metal oxide nanoparticles rapidly decreases, resulting in precipitates. The formed precipitate is in a kind of nanocomposite state in which the perfluorinated sulfonic acid ionomer and the metal oxide nanoparticles are combined. (FIG. 4) The process of centrifuging the precipitates and separating them by filtration, adding distilled water to the precipitates for dispersion in water, centrifuging the precipitates again and separating the precipitates by filtration, and dispersing the precipitates in distilled water is repeated until the aqueous solution becomes neutral. When the neutralized precipitate is dried using a freeze dryer, a powdery radical scavenger metal oxide-ionomer nanocomposite is obtained.

The resulting powder is added to an ionomer dispersion in which the perfluorinated sulfonic acid ionomer is dispersed in a mixed solvent of normal propyl alcohol and water, and when ultrasonic waves are applied at room temperature for a certain period of time, the powder disappears and a clear dispersion is formed. Through this phenomenon, it can be confirmed that the nanocomposite according to the present invention is redispersed in the size of nanoparticles in the ionomer dispersion. (FIG. 5)

Specifically, the method for preparing a highly-dispersible metal oxide-ionomer nanocomposite dispersion according to the present invention includes the steps of a) dissolving a radical scavenger metal oxide precursor in an ionomer dispersion: and b) adding sodium hydroxide or an aqueous ammonia solution to the solution and forming a radical scavenger metal oxide nanoparticle.

In the present invention, the radical scavenger metal oxide nanoparticle is synthesized in-situ from a radical scavenger metal oxide precursor in an ionomer dispersion, and the radical scavenger metal oxide may exist in a state of being dispersed in the ionomer solution in the form of a nanocomposite through a self-assembly process between the ionomer and the nanoparticle. Accordingly, the radical scavenger metal oxide-ionomer nanocomposite thus prepared is characterized in that it can be redispersed in the size of nanoparticle in an aqueous alcohol solution or an ionomer solution.

In addition, the present invention may further include the step c) of separating and drying the radical scavenger metal oxide-ionomer nanocomposite to obtain the nanocomposite in a powder state after step b). For example, in step c), after forming the radical scavenger metal oxide nanoparticle, an excess of sodium hydroxide or ammonia solution is added to rapidly change the pH of the solution, thereby precipitating and separating the nanocomposite, followed by freeze-drying. When the nanocomposite is prepared in the form of a powder, it is very useful in introducing the nanocomposite and redispersing the nanocomposite easily in the manufacturing process of an electrode or an electrolyte membrane.

The ionomer dispersion used in the present invention may be prepared by dispersing the perfluorinated sulfonic acid ionomer in a mixed solvent composed of alcohol and water. A mass ratio of alcohol to water suitable for dispersing the perfluorinated sulfonic acid ionomer is in the range of 99:1 to 20:80. In addition, the alcohol usable for the ionomer dispersion may be, for example, one or more selected from methanol, ethanol, 1-propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, 4-heptanol, and a mixture thereof, is not limited thereto.

Meanwhile, in the present invention, the ionomer dispersion in which the radical scavenger metal oxide nanoparticle is formed may be, for example, a nanodispersion prepared by dispersing a perfluorinated ionomer in a continuous phase containing alcohol and water under supercritical conditions. Preferably, the supercritical condition has a temperature of 100° C. to 300° C. and a pressure of 20 psig to 2,000 psig. The ionomer nanodispersion has improved dispersion characteristics using the supercritical condition. The supercritical fluid above a critical point exhibits solubility that is close to that of a liquid, a very low surface tension, and a permeability that is close to that of a gas. Also, since the solute has a low viscosity in a supercritical fluid, mass transfer can be promoted, so that the perfluorinated sulfonic acid ionomer can exhibit high solute diffusivity. As described above, the supercritical fluid permeates into ionomer chains, and thus weakens ionomer intermolecular/intramolecular interactions in an ionomer molecule, thereby forming nanoparticles. In addition, while repeating evaporation and condensation of a co-solvent of water and an alcohol as a liquid phase at a rapid rate under the supercritical condition, the content comes close to an azeotropic mixture composition under a predetermined temperature and a predetermined pressure, and during the condensation after the reaction is terminated, the content of the azeotropic mixture is absolutely increased.

In the present specification, the "azeotropic mixture" refers to a solution in which the component ratios of the solution and vapor become the same in a liquid having a specific component ratio when the liquid boils without a change in component ratio at a predetermined temperature as in a pure liquid. An equilibrium temperature, which is a boiling point of an azeotropic mixture, is referred to as an azeotropic point, an azeotropic state where the component ratios of a solution and vapor become the same is changed by pressure, and the azeotropic point exhibits a minimum value or a maximum value on a boiling point curve showing a relationship between the component ratio and the boiling point. The ionomer nanoparticle dispersion of the present invention has a high azeotropic mixture content in a continuous phase. The content is preferably 20% by weight to 50% by weight in the continuous phase. When the azeotropic mixture content in the continuous phase is within this range, an efficiency of removing the continuous phase, that is, the solvent may be maximized. In this case, when the azeotropic mixture content in the continuous phase is less than this range, the economic advantage is not significant because an evaporation rate of the solvent from the co-solvent is not as fast as that of the solvent from a general mixed solvent, and on the contrary, when the content in the co-solvent is more than this range, the content is meaningless because the content cannot be theoretically achieved.

In the present invention, it is preferable to use the perfluorinated sulfonic acid ionomer nanodispersion as the ionomer dispersion in which a metal oxide nanoparticle is formed from a metal oxide precursor because the dispersibility and stability of the metal oxide nanoparticle can be further improved.

As examples of a perfluorinated ionomer that can be used in the present invention, any one of poly(perfluorosulfonic acid), poly(perfluorocarboxylic acid), a copolymer of tetrafluoroethylene and fluorovinylether including a sulfonic acid group, and a combination thereof may be selected or commercially available Nafion, Flemion, Aciplex, the 3M ionomer, the Dow ionomer, the Solvay ionomer, the Sumitomo ionomer, or a mixture thereof may be used, but the present invention is not limited thereto.

Also, in the present invention, the metal oxide acting as a radical scavenger is preferably an oxide of a metal selected from among zirconium, cerium, manganese, and aluminum. Examples of the radical scavenger metal oxide precursor that can be used in the present invention may include zirconium nitrate, zirconium acetate, zirconium chloride, zirconium propoxide, zirconium butoxide, zirconium hydroxide, cerium nitrate, cerium chloride, cerium ammonium nitrate, cerium sulfate, cerium acetate hydrate, cerium acetylacetonate hydrate, cerium bromide, cerium carbonate hydrate, cerium chloride heptahydrate, cerium 2-ethylhexanoate, cerium fluoride, cerium hydroxide, cerium iodide, cerium nitrate hexahydrate, cerium oxalate hydrate, cerium sulfate hydrate, manganese sulfate, manganese chloride, manganese acetate, manganese nitrate, manganese hydroxide, aluminum sulfate, aluminum chloride, aluminum acetate, aluminum nitrate, mixtures thereof, or the like, but is not particularly limited thereto, and any ion-type radical scavenger metal compound is possible.

Meanwhile, in the present invention, the content of the radical scavenger metal oxide precursor added to the ionomer dispersion is preferably in the range of 0.1 to 500% by weight with respect to the ionomer solid content based on the ionomer dispersion. If the radical scavenger metal oxide precursor is added in an amount less than 0.1% by weight relative to the ionomer solid content, the amount of the radical scavenger metal oxide precursor is insufficient, and if the content of the radical scavenger metal oxide precursor exceeds 500% by weight, it is difficult to prepare a stable dispersion.

In addition, the present invention provides a highly-dispersible radical scavenger metal oxide-ionomer nanocomposite in which the radical scavenger metal oxide is synthesized in-situ from the radical scavenger metal oxide precursor in the ionomer dispersion, and the radical scavenger metal oxide is dispersed in the ionomer in the form of nanoparticle. The nanocomposite can be usefully used as an antioxidant in a fuel cell or the like.

The radical scavenger metal oxide-ionomer nanocomposite prepared according to the present invention has excellent dispersibility to the extent that it can be redispersed in an aqueous alcohol solution or ionomer solution in a nanoparticle size, so it can improve the compatibility with the ionomer of an electrode layer or a polymer electrolyte membrane. Specifically, in a fuel cell membrane electrode assembly including an anode and cathode composed of an electrode layer containing a catalyst and an ionomer, and an electrolyte membrane disposed between the anode and the cathode, the highly-dispersible radical scavenger metal oxide-ionomer nanocomposite according to the present invention may be included as an antioxidant in at least one of the electrode layer and the electrolyte membrane.

As described above, when the technology of synthesizing a radical scavenger metal oxide from a radical scavenger metal oxide precursor having high chemical stability and oxidation stability in an ionomer dispersion according to the present invention is applied to an electrolyte membrane or electrode layer of a fuel cell, it is possible to convert in-situ radical scavenger metal ions, which are convenient for initial introduction, to radical scavenger metal oxides. Thus, it can maintain dispersibility and proton conductivity even after introduction into the electrolyte membrane or electrode layer, and thus, the advantages of both the ion type and oxide type of radical scavenger metal can be exhibited, ultimately improving the durability and performance of the fuel cell. The following [Table 1] summarizes the advantages and disadvantages of the ion type radical scavenger metal oxide precursor and the radical scavenger metal oxide type, and the results related to durability improvement of the fuel cell to which the radical scavenger metal oxide-ionomer nanocomposite of the present invention is introduced are shown in FIGS. 10 to 14.

TABLE 1

| | Ion type radical scavenger metal oxide precursor | Metal oxide type | Metal oxide-ionomer nanocomposites |
|---|---|---|---|
| Convenience of introduction | ○ | ○ | ○ |
| Dispersibility | Δ (content dependent; limited) | X | ○ |
| Maintaining dispersibility after introduction | Δ (content dependent; limited) | X | ○ |
| Maintaining hydrogen ion conductivity | X | ○ | ○ |
| Metallic ion migration | ○ | X | X |

The present invention will be described in more detail through the following Examples. However, the following Examples are provided only to more easily understand the present invention, and the contents of the present invention are not limited by the Examples.

<EXAMPLE 1-1> PREPARATION OF CERIUM OXIDE-IONOMER NANOCOMPOSITE DISPERSION

A dispersion (solid content: 5 wt %, 25 wt %) in which 15 g of perfluorinated sulfonic acid ionomer was dispersed in a mixed solvent of alcohol and water or a supercritical nanodispersion was prepared. After adding 0.75 g, 1.5 g, and 2.0 g of cerium precursors (cerium nitrate, cerium chloride, cerium ammonium nitrate, or cerium sulfate) to the ionomer dispersion, respectively, a small amount of hydrochloric acid or nitric acid aqueous solution was added to the ionomer dispersion and stirred until the cerium precursor was completely dissolved. This solution was placed in a 60° C. oil bath and stirred for 6 to 24 hours to form a clear solution. 0.25 to 1.0 g of NaOH or ammonia aqueous solution was added to the above prepared solution, and then placed in a 60° C. oil bath and stirred for 6 to 24 hours to conduct additional reaction. During the reaction, the clear solution changed to a clear yellow solution. The prepared cerium oxide-ionomer dispersion was able to maintain the dispersion state for more than 3 months, and the particle size was in the range of 39 to 150 nm as measured by laser light scattering.

<EXAMPLE 1-2> PREPARATION OF CERIUM OXIDE-IONOMER NANOCOMPOSITE POWDER AND REDISPERSION

NaOH or aqueous ammonia was added to the clear yellow solution prepared in Example 1-1 until precipitation occurred. The solution in which precipitation occurred changed to a pink solution, and precipitates occurred to the extent that they could be observed with the naked eye. A process of centrifuging the precipitates and separating them by filtration, adding distilled water to the precipitates for dispersion in water, centrifuging the precipitates again and separating the precipitates by filtration, and dispersing the precipitates in distilled water was repeated until the aqueous solution become neutral. When the neutralized precipitates were dried using a freeze dryer, a yellow powder was obtained as illustrated in FIG. 6.

<EXAMPLE 1-3> DISPERSION TEST OF CERIUM OXIDE-IONOMER NANOCOMPOSITE

As a result of measuring the microstructure of the yellow powder prepared in Example 1-2 using scanning electron microscopy(SEM), as illustrated in FIGS. 7 and 8, particles having a size of 5 to 10 nm were evenly dispersed throughout. When 0.00015 g and 0.00025 g of yellow powder were added to a solution in which 15 g of perfluorinated sulfonic acid ionomer was dispersed (solid content 5 wt %, 25 wt. %), respectively, and dispersed for 30 minutes using an ultrasonicator to form a nanodispersion. The particle size of the formed nanodispersion was 30 to 40 nm as measured by laser light scattering.

<EXAMPLE 2-1> PREPARATION OF ALUMINUM OXIDE-IONOMER NANOCOMPOSITE DISPERSION

A dispersion (solid content: 5 wt %, 25 wt %) in which 15 g of perfluorinated sulfonic acid ionomer was dispersed in a mixed solvent of alcohol and water or a supercritical nanodispersion was prepared. After adding 0.75 g, 1.0 g, and 1.25 g of aluminum oxide precursor (aluminium sulfate, aluminium chloride, aluminium acetate, or aluminium nitrate) to the ionomer dispersion, respectively, a small amount of hydrochloric acid or nitric acid aqueous solution was added to the ionomer dispersion and stirred until the aluminum oxide precursor was completely dissolved. This solution was placed in a 60° C. oil bath and stirred for 6 to 24 hours to form a clear solution. 0.25 to 1.0 g of NaOH or ammonia aqueous solution was added to the above prepared solution, and then placed in a 60° C. oil bath and stirred for 6 to 24 hours to conduct additional reaction. During the reaction, the clear solution changed to a clear blue solution (FIG. 9). The prepared aluminum oxide-ionomer dispersion was able to maintain the dispersion state for more than 3 months, and the particle size was in the range of 40 to 180 nm as measured by laser light scattering.

<EXAMPLE 2-2> PREPARATION OF ALUMINUM OXIDE-IONOMER NANOCOMPOSITE POWDER

NaOH or aqueous ammonia was added to the clear blue solution prepared in Example 2-1 until precipitation occurred. The solution in which precipitation occurred changed to a pink solution, and precipitates occurred to the extent that they could be observed with the naked eye. A process of centrifuging the precipitates and separating them by filtration, adding distilled water to the precipitates for dispersion in water, centrifuging the precipitates again and separating the precipitates by filtration, and dispersing the precipitates in distilled water was repeated until the aqueous solution become neutral. When the neutralized precipitates were dried using a freeze dryer, a white powder was obtained.

<EXAMPLE 2-3> DISPERSION TEST OF ALUMINUM OXIDE-IONOMER NANOCOMPOSITE

As a result of measuring the microstructure of the white powder prepared in Example 2-2 using scanning electron microscopy(SEM), particles having a size of 5 to 10 nm were evenly dispersed throughout. When 0.00015 g (0.001 wt %) and 0.75 g (5 wt %) of white powder were added to a solution in which 15 g of perfluorinated sulfonic acid ionomer was dispersed, respectively, and dispersed for 30 minutes using an ultrasonicator to form a nanodispersion. The particle size of the formed nanodispersion was 40 to 60 nm as measured by laser light scattering.

<EXAMPLE 3> PERFORMANCE TEST OF AN ELECTROLYTE MEMBRANE TO WHICH CERIUM OXIDE-IONOMER NANOCOMPOSITE IS INTRODUCED

In this embodiment, a technique for synthesizing a cerium oxide, that is, ceria, from a cerium precursor in an ionomer dispersion was applied to introduce the cerium oxide as an antioxidant in an electrolyte membrane for a fuel cell. Cerium ions are easily introduced in the manufacturing process, and ceria, which is a cerium oxide, can improve chemical durability and oxidation stability of an electrolyte membrane as an antioxidant if dispersibility is maintained after introduction. Accordingly, as in the present invention, when cerium ions are in-situ converted to ceria in the isomer and introduced into the electrolyte membrane, dispersibility and hydrogen ion conductivity can be maintained, thereby exhibiting the advantages of both the ion type and oxide type of cerium. Therefore, the durability and performance of the fuel cell can be improved.

FIGS. 10 and 11 shows graphs confirming that ceria, which is a cerium oxide, was successfully synthesized from a cerium precursor according to the present invention, and that the content of metal oxide in the metal oxide-ionomer nanocomposite was very high compared to the total content.

In addition, according to FIGS. 12 and 13, it can be seen that there is no significant change in the ionic conductivity and gas permeability of the electrolyte membrane after the introduction of the cerium oxide-ionomer nanocomposite according to the present embodiment, so that it was confirmed that an interface problem due to ceria aggregation did not occur.

Meanwhile, FIG. 14 shows a graph illustrating the results of the Fenton test, and it can be confirmed that the chemical decomposition of the polymer main chain by radicals is significantly alleviated after introducing the cerium oxide-ionomer nanocomposite according to the present invention, thereby improving the durability of the electrolyte membrane.

The invention claimed is:

1. A method for preparing a highly-dispersable radical scavenger metal oxide-ionomer nanocomposite in which a metal oxide nanoparticle and an ionomer are dispersed in a nanocomposite form through a self-assembly process, the method comprising the steps of:

a) dissolving a radical scavenger metal oxide precursor in a perfluorinated sulfonic acid ionomer dispersion;

b) adding sodium hydroxide or ammonia aqueous solution to the perfluorinated sulfonic acid ionomer dispersion to form a radical scavenger metal oxide-ionomer nanocomposite in an in-situ manner; and c) separating and drying the radical scavenger metal oxide-ionomer nanocomposite to obtain a powder state of the radical scavenger metal oxide-ionomer nanocomposite.

2. The method of claim 1, wherein the step c) includes a process of precipitating and separating the radical scavenger metal oxide-ionomer nanocomposite by rapidly changing pH and freeze-drying the radical scavenger metal oxide-ionomer nanocomposite.

3. The method of claim 1, wherein the perfluorinated sulfonic acid ionomer dispersion is prepared by dispersing a perfluorinated sulfonic acid ionomer in a mixed solvent composed of alcohol and water.

4. The method of claim 1, wherein the radical scavenger metal oxide is an oxide of a metal selected from zirconium, cerium, manganese, and aluminum.

5. The method of claim 1, wherein the radical scavenger metal oxide precursor includes one or more selected from the group consisting zirconium nitrate, zirconium acetate, zirconium chloride, zirconium propoxide, zirconium butoxide, zirconium hydroxide, cerium nitrate, cerium chloride, cerium ammonium nitrate, cerium sulfate, cerium acetate hydrate, cerium acetylacetonate hydrate, cerium bromide, cerium carbonate hydrate, cerium chloride heptahydrate, cerium 2-ethylhexanoate, cerium fluoride, cerium hydroxide, cerium iodide, cerium nitrate hexahydrate, cerium oxalate hydrate, cerium sulfate hydrate, manganese sulfate, manganese chloride, manganese acetate, manganese nitrate, manganese hydroxide, aluminum sulfate, aluminum chloride, aluminum acetate, aluminum nitrate, and a mixture thereof.

6. The method of claim 1, wherein the radical scavenger metal oxide precursor is added in a range of 0.1 to 500% by weight based on the perfluorinated sulfonic acid ionomer dispersion.

7. The method of claim 1, wherein the perfluorinated sulfonic acid ionomer dispersion is a nanodispersion that is prepared by dispersing a perfluorinated ionomer in a continuous phase containing alcohol and water under a supercritical condition.

8. The method of claim 7, wherein the supercritical condition has a temperature of 100 to 300° C. and a pressure range of 20 to 2000 psig.

9. The method of claim 7, wherein the perfluorinated sulfonic acid ionomer dispersion has an azeotrope content in a range of 20% by weight to 50% by weight in the continuous phase.

* * * * *